United States Patent Office — 2,857,411 — Patented Oct. 21, 1958

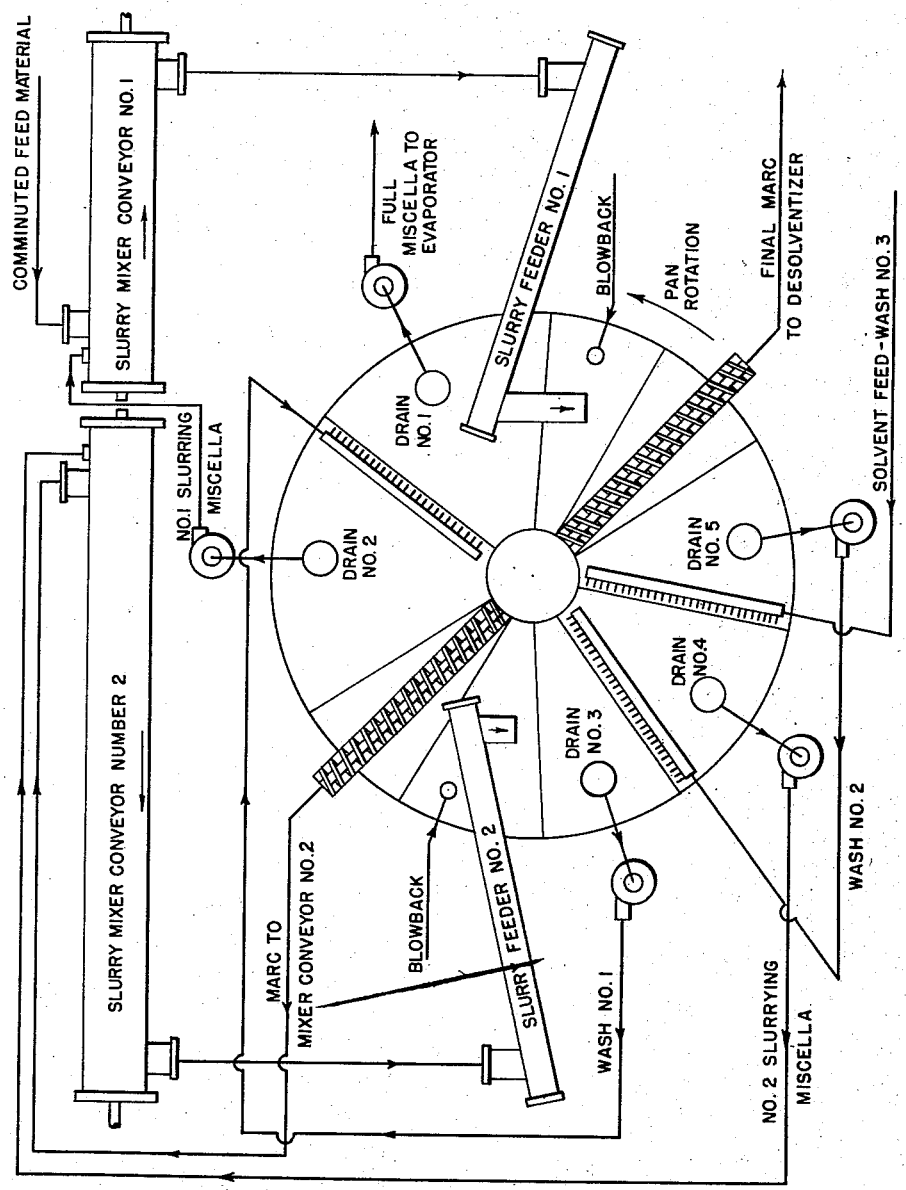

2,857,411

DOUBLE SOAK FILTRATION-EXTRACTION OF VEGETABLE OIL-BEARING MATERIALS

Esler L. D'Aquin, Henry L. E. Vix, Angelo V. Graci, Jr., Edward A. Gastrock, and James J. Spadaro, New Orleans, La., assignors to the United States of America as represented by the Secretary of Agriculture Application June 7, 1954, Serial No. 435,101

6 Claims. (Cl. 260—412.4)

(Granted under Title 35, U. S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to a process for the solvent extraction of solid vegetable oil-bearing materials to produce oils and meals.

In a solvent extraction process, the oil-bearing material is usually somewhat concentrated by removing low oil-containing components such as hulls, skins, etc., and comminuting the material into suitably small particles. Where the concentrated oil-bearing material particles are those obtained from an oilseed, they are commonly called vegetable oil-bearing "meats." And, for simplicity of language, the term "meats" will be employed to include flaked or particulate particles of oilseed meats, such as cottonseed meats, or concentrated oil-bearing particles of other vegetable oil-bearing materials such as rice bran. The meats are brought into contact with a liquid oil solvent. The solvent dissolves oil to form a solution which is commonly called a "miscella." The most concentrated miscellas formed in the course of the process are called "full miscellas." The full miscellas are drained away from the undissolved solid particles and sent to an evaporator of the oil recovery system. In the oil recovery system, the oil produced is isolated, and the solvent is recovered for reuse. The undissolved solvent wet particles are called the "marc," and the particles from which the desired amount of oil has been removed are called the "final marc." The final marc is sent to a desolventizer of the meal recovery system to isolate the meal produced and to recover the solvent for reuse.

Co-pending applications, Serial Nos. 276,026, filed March 11, 1952, now Patent No. 2,726,253, and 314,234, filed October 10, 1952, now Patent No. 2,727,914, relate to processes of solvent extracting solid vegetable oil-bearing materials by means of a "filtration-extraction." In accordance with those processes, the vegetable oil-bearing materials are first conditioned by a mild moist cooking and crisping treatment and the conditioned materials are subjected to the filtration-extraction. In the filtration-extraction processes described in the co-pending applications, the conditioned oil-bearing material particles are soaked in a relatively concentrated miscella and the resultant marcs are substantially freed of entrained miscella by means of vacuum filtration. In a preferred mode of operation, the soaking is accomplished by gently agitating the particles in contact with more than enough miscella to wet the particles. The slurry formed by the soaking is deposited on the bed of a continuous vacuum filter that is arranged so that particles on the filter bed can be washed by contacting the particles with a series of separate portions of liquids and separately filtering off and collecting the portions of liquids. The miscella in which the oil-bearing materials have been soaked is filtered off and sent to the solvent recovery system. The undissolved oil-bearing material particles remain in the marc left on the filter bed. And, the marc left on the filter bed is subjected to a series of countercurrent washings with increasingly dilute miscellas to substantially free the undissolved particles of entrained miscella. After a final washing with oil-free solvent, the final marc is removed from the filter bed and sent to the desolventizer.

The process of the above co-pending applications have proven to be well suited for solvent extracting a wide variety of oil-bearing materials to produce meals containing about 1 to 3% residual lipids (by weight). However, some materials, for example, unusually dry cottonseed meats, require a very carefully controlled and precise conditioning treatment to produce materials having a filtration mass velocity (the measure of the filtration rate that can be obtained in a given vacuum filtration) which is high enough to permit efficient operation. In addition, in numerous instances it is desirable to "exhaustively" extract the vegetable oil-bearing materials, i. e., to remove enough oil to produce meals containing less than about 1% residual lipids.

A primary object of the present invention is to provide a process for solvent extracting vegetable oil-bearing materials by means of filtration-extraction, which process is particularly adapted for either exhaustively extracting the oil-bearing materials or, in an extraction producing meals containing from about 1 to 3% residual lipids, extracting an unusually large amount of oil-bearing materials per unit of filter bed area per unit time. A further object is to provide a solvent extraction process which is particularly adapted for extracting oil-bearing materials which have not been subjected to a carefully controlled conditioning treatment.

We have discovered that the above and other objects are accomplished by a double soak filtration-extraction process.

In commercially feasible solvent extraction processes it is important that a relatively concentrated miscella be the first liquid oil solvent to contact the material being extracted so that the initial contact produces a full miscella of the desired concentration. We have found that in a filtration-extraction process, most of the oil dissolves while the oil-bearing material meats are being soaked, and that the main function of subsequent washings is to wash out entrained concentrated miscellas. Substantially full miscellas dissolve additional oil much slower than relatively dilute miscellas. And, we have discovered that in a filtration-extraction process, when a once soaked marc is removed from the filter bed and re-soaked before all of the available oil has been removed, the overall rate and extent of the extraction is materially increased without an appreciable decrease in the filtration mass velocity and without an appreciable increase in the "fines" or other extraction problems.

In general, the present invention provides a process of continuously solvent extracting vegetable oil-bearing materials which involves first extracting the materials until most but not all of their oil content is removed by soaking the materials in a relatively concentrated miscella, preferably a full miscella, to form a flowable slurry, and freeing the resultant relatively high oil content marc of substantially all of the entrained miscella by filtration and at least one washing with less than a full miscella, the filtration, for example, being a vacuum filtration carried out on the bed of a continuous filter, the filtration characteristics of which are substantially equivalent to those of a 20 to 100 mesh standard wire mesh screen, by depositing the slurry on said filter bed and gently agitating the slurry on the bed by forcing a stream of inert gas to flow up through the bed into the slurry and draining off the miscella by means of vacuum;

then re-extracting the filtered and washed marc by soaking it in less than a full miscella for about 10 to 60 minutes, and freeing the soaked marc from substantially all entrained miscella by filtration, preferably by vacuum filtration as described above, and a plurality of washings using miscellas increasing less than full and finally oil-free solvent. In a preferred mode of operation the vegetable oil-bearing material is converted to concentrated vegetable oil-bearing meats prior to solvent extraction, the meats are soaked by gently agitating them in contact with more than enough miscella to wet their particles, and the undissolved particles are freed of substantially all the miscellas they entrain by depositing the slurries formed in the soaking operations upon the bed of a continuous vacuum filter that is arranged so that particles on the filter bed can be washed by contacting them with separate portions of liquids and separately filtering off and collecting the portions of liquids, draining off the bulk of the liquid associated with the particles, and countercurrently washing the particles remaining on the filter bed with increasingly dilute miscellas.

The accompanying drawing is a schematic flow sheet illustrating apparatus for carrying out the double soak filtration-extraction process.

Referring to the drawing, a "comminuted feed material," consisting of particles of a solid vegetable oil-bearing material comminuted to about the size produced by the usual hulling and/or cracking and flaking operations, is fed into "Slurry Mixer Conveyor No. 1." In this vessel the oil-bearing material particles, or "solids," are soaked in a relatively concentrated miscella. A preferred relatively concentrated miscella comprises hexane containing the oil dissolved in the course of being used as the second and first washes of previously soaked washed and resoaked solids, as the soaking liquid for previously once soaked and washed solids, and as the first wash or previously once soaked solids. Such as miscella contains from about 5 to 25% of oil by weight depending primarily on the oil content of the vegetable oil-bearing material and the desired solvent to oil-bearing material ratio. The term solvent to oil-bearing material or meats ratio is defined as the weight ratio of oil-free solvent to concentrated vegetable oil-bearing material particles.

The slurry mixer conveyors are vessels, provided with agitators arranged to gently mix solids with liquids while conveying the slurries so formed to a discharge outlet. The first slurry mixer conveyor is preferably arranged to provide a relatively short soaking time of from about 3 to 30 minutes and the second slurry mixer conveyor is preferably arranged to provide a relatively long soaking time of about 10 to 60 minutes.

Slurry Feeder No. 1 feeds the slurry discharged from the first mixer conveyor onto a moving horizontal filter bed of a continuous vacuum filter that is arranged so that particles on the filter bed can be washed by contacting them with separate portions of liquid and separately filtering off and collecting the portions of liquids.

The "blowback" near the point of slurry feed is arranged to blow a stream of inert gas up through the filter bed and the oncoming slurry, to increase the tendency of the larger particles in the slurry to settle to the bottom of the cake of particles being formed on the filter bed, and also to push any fine particles left in the pores of the filter bed and the residual cake, up into the forming cake, where the particle distribution prevents them from causing a material lowering of the filtration rate.

As the portion of the filter bed on which the slurry has been deposited moves over "Drain No. 1" most of the liquid in contact with the particles, which has now dissolved sufficient oil to constitute a full miscella, is drawn into the drain by vacuum filtration and then pumped to the "evaporator." Where the full miscella contains an objectionable amount of fines, it can advantageously be filtered by pumping it back onto the solids on the filter bed and straining it through the filter cake, at a point between the first drain and "Wash No. 1."

As the solids remaining on the filter bed move farther along, they are first washed with a miscella, such as hexane containing the oil dissolved in the course of having been used as the second and first washes of previously soaked washed and resoaked solids and as the soaking liquid for previously once-soaked and washed solids.

The washed and drained solids are then removed from the filter bed by conventional mechanical means such as a discharge scroll and fed into "Slurry Mixer Conveyor No. 2" where they are soaked in a relatively dilute miscella such as hexane containing the oil dissolved in the course of being used as the second and first washes of previously soaked and washed and resoaked solids.

"Slurry Feeder No. 2" feeds the slurry discharged from the second mixer conveyor back onto the filter bed where the supported and drained solids are first washed with a dilute miscella such as hexane containing the oil dissolved in the course of being used as the second wash of solids discharged from the second mixer conveyor. The solids are secondly, and finally, washed with oil-free solvent, such as hexane.

Where the action of the blowback near Slurry Feeder No. 2 tends to cause an appreciable accumulation of fines "upstream" of the resoaking operation, the blowback at this point can advantageously be restricted or eliminated or replaced by vacuum, or "Drain No. 3" liquid can be filtered by straining it through the cake on the filter bed at a point between Drain No. 3 and "Wash No. 2."

While in Figure 1, the scroll which removes undissolved solids from the filter bed for resoaking, is illustrated to be opposite the scroll which removes the "final marc," this scroll is preferably independently driven and can be installed at any location and angle, relative to the final marc scroll, which provides adequate filter area for the proper extraction of oil both before and after the resoaking. The scrolls are preferably adjusted to leave a relatively thin layer of solids on the filter bed, to form a residual cake or heel.

The process provided by the invention can advantageously be used in the solvent extraction of oil from oil-bearing seeds or nuts having relatively high oil contents, such as cottonseed, peanuts, sesame, flaxseed, sunflower seed, and the like, as well as in the extraction of such seeds or beans having relatively low oil content, such as soybeans, okra, tomato, and the like, and also in the extraction of oil-bearing materials other than seeds, nuts, and beans, such as oil cakes, copra, rice bran, wheat germ, corn germ and the like.

Where it is desired to extract substantially all of the oil from a particularly vegetable oil-bearing material, the oil-bearing material is preferably subjected to the preparation process more fully described in the co-pending applications referred to above. Basically, the preparation process comprises the combination of a mild moist heat treatment sufficient to make the oil easily extractable but insufficient to appreciably damage the protein, with a crisping treatment, which is a partially dehydrative cooling that converts the heat treated means into relatively porous and incompressible granules.

Substantially any of the commonly used liquid oil extraction solvents can be used. The commercial hexanes, the heptanes, and the methylpentanes are particularly suitable.

In conducting the process of this invention, the proportion of oil to be removed in the step of first extracting most but not all of the oil can be varied widely depending upon whether exhaustive extraction is desired, the oil content of the material being extracted, the ratio of solvent to oil-bearing material, and the like factors. In general, it is preferable to remove from about 70% of the oil from press-cakes and low oil content oil-bearing materials such as rice bran to about 90% of the oil from high oil content oil-bearing materials such as copra, particularly where it is desired to ultimately produce a meal containing not more than about 1% lipids.

The amount of oil present in the miscella, in which the oil-bearing materials are first soaked, can also be varied widely depending upon whether exhaustive extraction is desired, the oil content of the material being extracted, the desired ratio of solvent to oil-bearing material and the like factors. In general, it is preferred to use miscellas containing from about 5 to 25% of oil by weight, with the lower oil content miscellas being used with the lower oil content oil-bearing materials.

The number of times the particles supported on the filter bed are washed with oil solvents, both during the step of extracting most of the oil and during the step of extracting substantially all of the remaining oil, as well which particles supported on the filter bed can be washed with substantially separate liquids and filtered to yield substantially separate filtrates is preferred. The filter bed can be substantially any type of a filtering medium. Filter beds having filtration characteristics equivalent to those of standard wire mesh screen of from about 20 to 100 mesh are preferred.

The following examples are illustrative of details of the invention. In each case, percent refers to percent by weight calculated on an "as is" basis.

Various vegetable oil-bearing materials were subjected to stagewise countercurrent double-soak solvent extraction under comparable conditions. The results are indicated in Table 1.

Table 1

| Example No. | 1 Cooked [1] Cottonseed Flakes 1 | | | 2 Cooked Cottonseed Flakes 2 | | | 3 Cooked Sesame Flakes | | |
|---|---|---|---|---|---|---|---|---|---|
| Mat'l Processed, Percent H$_2$O [4] | 10.6 | | | 6.7 | | | 5.3 | | |
| Mat'l Processed, Percent Lipids [4] | 28.27 | | | 32.08 | | | 56.11 | | |
| Extraction Process | A | B | C | A | B | C | A | A | B |
| Solvent-Oil-Bearing Mat'l. Ratio | 1.1 | 1.1 | 1.1 | 1.2 | 1.2 | 1.2 | 1.7 | 1.7 | 1.7 |
| Cake Thickness, In | 2 | 2 | 2 | 2 | 2 | 2 | 1¾ | 1¾ | 1⅝ |
| Vacuum, In. Mercury | 4 | 4 | 4 | 4 | 4 | 4 | 4 | 4 | 4 |
| Slurry Time, Mins | 30 | 15 | 15 | 30 | 15 | 15 | 30 | 60 | 15 |
| Slurry Temp., °F | 135 | 135 | 135 | 135 | 135 | 135 | 135 | 130 | 130 |
| Re-slurry Time, Mins | | 30 | 30 | | 30 | 30 | | | 30 |
| Re-slurry Temp., °F | | 135 | 135 | | 135 | 135 | | | 130 |
| Slurrying Miscella, Percent Lipids | 10.0 | 10.0 | 10.0 | 0 | 0 | 0 | 0 | 0 | 0 |
| No. 1 Wash, Percent Lipids [3] | 5.0 | 5.0 | 5.0 | 0 | 0 | 0 | 0 | 0 | 0 |
| Re-slurrying Miscella, Percent Lipids | | 1.5 | | | | | | | |
| No. 2 Wash, Percent Lipids [3] | 0.5 | 0.5 | 1.5 | 0 | 0 | 0 | 0 | 0 | 0 |
| Re-slurrying Miscella, Percent Lipids | | | 0.5 | | | | | | |
| No. 3 Wash, Percent Lipids [3] | 0 | 0 | 0 | 0 | 0 | 0 | 0 | 0 | 0 |
| Washes, Temp., °F | 135 | 135 | 135 | 135 | 135 | 135 | 135 | 130 | 130 |
| Washes, Avg. Mass Velocity [2] | 3,110 | 3,300 | 3,290 | 2,950 | 3,180 | 3,050 | 3,230 | 3,850 | 3,790 |
| Desolventized Cake, Percent H$_2$O [4] | 6.9 | 7.2 | 7.2 | 8.7 | 8.9 | 8.7 | 7.4 | 7.6 | 7.2 |
| Desolventized Cake, Percent Lipids [4] | 1.80 | 1.00 | 0.93 | 1.78 | 1.04 | 1.16 | 1.21 | 0.92 | 0.52 |

| Example No. | 4 Raw [1] Soybean Flakes | | | 5 Cooked [1] Peanut Flakes | | | | | |
|---|---|---|---|---|---|---|---|---|---|
| Mat'l Processed, Percent H$_2$O [4] | 9.8 | | | 4.0 | | | | | |
| Mat'l Processed, Percent Lipids [4] | 20.78 | | | 43.63 | | | | | |
| Extraction Process | A | C | C | A | A | B | B | B | |
| Solvent-Oil-Bearing Mat'l. Ratio | 1.0 | 1.0 | 1.3 | 1.5 | 1.2 | 1.5 | 1.2 | 0.8 | |
| Cake Thickness, In | 2 | 2 | 2 | 1⅞ | 1⅞ | 1⅞ | 1⅞ | 1⅞ | |
| Vacuum, In. Mercury | 4 | 4 | 4 | 4 | 4 | 4 | 4 | 4 | |
| Slurry Time, Mins | 30 | 15 | 15 | 30 | 30 | 15 | 15 | 15 | |
| Slurry Temp., °F | 130 | 130 | 130 | 140 | 140 | 140 | 140 | 135 | |
| Re-slurry Time, Mins | | 30 | 30 | | | 30 | 30 | 30 | |
| Re-Slurry Temp., °F | | 130 | 130 | 140 | 140 | 140 | 140 | 135 | |
| Slurrying Miscella, Percent Lipids | 10.0 | 10.0 | 10.0 | 10.0 | 12.5 | 10.0 | 12.5 | 19.0 | |
| No. 1 Wash, Percent Lipids [3] | 5.0 | 5.0 | 5.0 | 5.0 | 6.3 | 5.0 | 6.3 | 9.5 | |
| Re-slurrying Miscella, Percent Lipids | | | | | | 1.5 | 1.9 | 2.4 | |
| No. 2 Wash, Percent Lipids [3] | 0.5 | 1.5 | 1.5 | 1.5 | 1.9 | 0.6 | 0.6 | 0.8 | |
| Re-slurrying Miscella, Percent Lipids | | 0.5 | 0.5 | | | | | | |
| No. 3 Wash, Percent Lipids [3] | 0 | 0 | 0 | 0 | 0 | 0 | 0 | 0 | |
| Washes, Temp., °F | 130 | 130 | 130 | 140 | 140 | 140 | 140 | 135 | |
| Washes, Avg. Mass Velocity [2] | 1,880 | 1,600 | 1,740 | 5,369 | 4,137 | 4,772 | 4,497 | 3,292 | |
| Desolventized Cake, Percent H$_2$O [4] | 8.0 | 8.1 | 9.1 | 7.6 | 7.5 | 7.6 | 7.8 | 7.4 | |
| Desolventized Cake, Percent Lipids [4] | 3.52 | 1.76 | 1.18 | 1.77 | 2.72 | 0.72 | 0.89 | 1.10 | |

A = Single slurrying, followed by three washes.
B = 1 wash before re-slurrying, followed by 2 washes.
C = 2 washes before re-slurrying, followed by 1 wash.
[1] Tests using washes having respective oil concentrations obtained in continuous pilot plant runs with 3' diameter filter unit.
[2] Pounds per hour of liquid passing through 1 square foot of filter screen area.
[3] Percent oil indicates oil-free solvent (hexane).
[4] Analysis by American Oil Chemists' Society Official Methods.

as the oil content of the wash liquids, can be varied widely.

Substantially any of the commonly used apparatuses for mixing solids with liquids, conveying slurries or solids, and the like can be used for the slurrying operation. Also, both operations may be carried out in a single, divided vessel using a single agitating conveyor shaft or separate agitating conveyors.

The times for which the particles are mixed with the oil solvents in either of the suspending steps and the temperatures prevailing can be varied widely.

The filter used can be substantially any type of continuous vacuum filter having a plurality of spaces in The materials used were (a) soybeans, Example No. 4, a relatively low oil content bean which had been cracked, heat-tempered and flaked in the conventional manner; (b) cottonseed, a medium oil-content oilseed, Nos. 1 and 2, each of which had been dehulled, cracked, flaked, cooked and crisped as described in the above mentioned co-pending application, Serial No. 276,026; (c) sesame, a high oil-content oilseed, No. 3, which had been dried, cracked, flaked, and then cooked and crisped as prescribed in the above co-pending application; and (d) peanuts, a high oil-content nut, No. 5, which had been de-shelled, cracked, flaked, and then cooked and crisped, and re-rolled through smooth flaking rolls as prescribed in the above co-pending application.

The solvent extraction processes used were conducted on a bench scale test unit designed to simulate the operation of a commercial scale unit employing a continuous horizontal rotary vacuum filter having a plurality of spaces in which particles on the filter bed can be washed with different liquids and can be collected separately. In each case, the liquids brought into contact with solid oil-bearing materials were removed from the undissolved solids by vacuum filtration.

"Process A" simulated the filtration-extraction process as heretofore practiced. The oil-bearing materials were soaked once by suspending them in the indicated hexane miscella for the times and temperatures as indicated as "slurry times" and "slurry temperatures." The once soaked meats were then filtered and countercurrently washed three times. The oil contents of the miscellas used are indicated as the percentage lipids in the "slurrying miscellas," and "Washes Nos. 1, 2, and 3."

"Process B" simulated one embodiment of the double soak filtration-extraction process provided by this invention. The oil-bearing materials were soaked, filtered, and washed once, then resoaked, filtered, and countercurrently washed twice.

"Process C" simulated another embodiment of the double soak filtration-extraction process provided by this invention. The oil-bearing materials were soaked, filtered, and countercurrently washed twice, then resoaked, filtered and washed once.

The improvements provided by the double soak filtration-extraction process can advantageously be used to accomplish useful results other than an increase in the amount of oil extracted from a given oil-bearing material. For example, should an operator using an embodiment of the present process, such as process B above, be interested in increasing the capacity of a given size filter unit, he could do so by decreasing the solvent-to-oil-bearing material particles ratio down to the point where the residual lipids in the cake increases to the level obtained or desired by a conventional filtration-extraction process. In so doing, the product miscella would be increased in concentration proportionally, and the stream costs for evaporating same would be lowered proportionally.

The benefits derivable from being able to reduce the overall solvent-to-oil-bearing material particles ratio increases as the oil content of the raw material to be extracted increases. In the filtration-extraction of high oil content oil-bearing materials such as peanuts, copra, and the like, to produce meals containing about 1% residual lipids, it is generally not feasible to use an overall solvent-to-meats ratio of less than about 1.6 to 2.0 parts of solvent per part of meats nor to produce full miscellas containing more than about 25–30% of oil. However, by the present double soak filtration-extraction process, the high oil content oil-bearing materials can advantageously be solvent extracted to produce meals containing about 1% residual lipids by using a solvent-to-meats ratio of from about 0.8 to 1.1 parts of solvent per part of meats and producing full miscellas containing from about 40 to 50% of oil. The extent to which the solvent ratio for process B or C can be diminished beyond that required by process A, for an equivalent extraction efficiency without any appreciable reduction in mass velocity or capacity of a given size filter unit, may be illustrated as follows: The data in Example 5 shows that a high oil content material such as peanuts can be extracted to a 1.10% residual lipids content by process B using an 0.8 solvent ratio and yielding a product miscella having an oil concentration of 47%. These results indicate that for a solvent ratio of about 0.7, the residual lipids would increase to about 1.3%, and that for a solvent ratio of 0.6, using process B or C, the residual lipids would increase to about 2.0% and the product miscella concentration would be about 50% oil. From the above relationships, it is further indicated that an oil-bearing material containing 63% oil which can be extracted by process A to 1.25% residual lipids and 26% miscella concentration using a 2.0 solvent ratio, can readily be extracted by process B or C to less than 1.0% lipids and a miscella concentration of 46.0% using a solvent ratio of 1.0; and also, that such a material can be extracted to a lipids content of less than 2.0% and a product miscella concentration of 59.0% using a 0.7 solvent ratio. It is noted that where the solvent ratio is reduced to the point where the slurries in the slurry mixer conveyors become too insufficiently wetted and viscous to be efficiently handled by the mixer conveyors or the slurry feeders, they (the slurries) can advantageously be diluted as desired by bleeding off a portion of the full miscella from Drains 1 or 2 and pumping or otherwise adding it into the mixer conveyors and/or feeders as required. The use of such low solvent ratios to remove substantially all of the oil from oil-bearing materials at relatively unimpaired mass velocities, together with the high product miscella concentrations attainable is believed to be unprecedented in the solvent extraction industry.

When using a process such as process A, the extraction of a large number of the difficult-to-extract oil-bearing materials, such as copra, flaxseed, sesame, castor beans, germs, etc., to produce meals containing less than about 3% residual lipids either requires drying to 2 to 4% moisture content, followed by much more severe comminution than is usually produced by grinding, flaking, etc., to sufficiently reduce the particle size prior to cooking, or requires re-rolling of the material after cooking. Such a severe comminution produces a final extracted cake or meal product which is invariably overly fine and dusty. This is sometimes a serious deterrent to its marketability. However, when the same oil-bearing materials are extracted by a double soak process, such as process B or C, it is not necessary to comminute them so severely and the final extracted meal products are of a coarser consistency and more acceptable to the meal trade. Another significant benefit which accrues directly from the fact that the oil-bearing material does not have to be comminuted as severely is that a higher filtration rate is obtained due to the larger average particle size, and thus a higher capacity can be handled on a given size filter unit.

The reforming of the filter cake after the resoaking operation is an additional advantage of the present double soak filtration-extraction process. It has been observed in the pilot plant operation of process A that the filtration rate or mass velocity of the filtering liquids after the third wash tends to be lower than that after the second wash, and the rate after the second wash tends to be lower than that after the first wash. This gradual retardation of the filtration rate is attributed mainly to a tendency of the filter cake to progressively compact under vacuum, and to the washing down of fines towards the bottom of the filter cake. The degree of retardation is enhanced when the filter cake contains an appreciable proportion of fine particles which tend to concentrate just above the filter screen in the form of an impervious strata and may cause excessive flooding of the wash liquids above the filter cake. Removal of the cake from the filter pan for reslurrying and redepositing it on the pan interrupts the slowing of the filtration rate and counteracts this difficulty to a great extent.

Use of the double-soak process B or C presents still another advantage over the single-soak process A, where skins, shells, hulls, and the like are contained in the prepared feed material. It has been observed that the skins of peanuts and soybeans and the hulls of cottonseed exert an umbrella effect when present in the filter cake and tend to shield the material directly beneath them from the washing action of the wash liquids and thus retard the removal of the miscella and oil. When in the double-soak' process the cake is removed and redeposited, the position of each of the shielding particles and their distribution is disrupted, and the efficiency of the washing is appreciably improved. In addition, the resoaking accomplishes a substantially complete extraction of meat particles which happen to be trapped within skins or hulls that have curled up during the cooking operation.

We claim:

1. A process of solvent extracting a vegetable oil-bearing material to obtain oil and a meal containing less than about 1% residual lipids consisting of the steps of extracting particles of the vegetable oil-bearing material to remove most of the oil content thereof by soaking the particles in a full miscella, comprising about from 5 to 25%, by weight, of the vegetable oil being extracted dissolved in an oil extraction solvent therefor, for about from 3 to 30 minutes, freeing the resultant marc from substantially all entrained miscella by filtration and at least one washing with less than said full miscella, re-extracting the filtered and washed marc by soaking it in less than said full miscella for about from 10 to 60 minutes, and freeing the soaked marc from substantially all entrained miscella by filtration and a plurality of washings using miscellas increasingly less than said full miscella and finally oil-free solvent, said steps being carried out using an overall solvent to oil-bearing particles ratio ranging from about 0.7–1.1 to 1.0.

2. The process of claim 1 wherein the oil-bearing material contains less than about 45% by weight of extractable oil, the oil extraction solvent is hexane, and the overall solvent to oil-bearing particles ratio ranges from about 0.7–0.9 to 1.0.

3. The process of claim 1 wherein the oil-bearing material contains more than about 45% by weight of extractable oil, the oil extraction solvent is hexane, and the overall solvent to oil-bearing particles ratio ranges from about 0.8–1.1 to 1.0.

4. A process of solvent extracting a vegetable oil-bearing material to obtain oil and a meal containing less than about 1% residual lipids comprising subjecting particles of the vegetable oil-bearing material to both a mild moist heat-treatment sufficient to make the oil readily extractable but insufficient to appreciable damage the protein content thereof and to a partially dehydrative cooling sufficient to convert the heat-treated particles to relatively porous and incompressible granules, and then subjecting the thus-treated particles to a process consisting of the steps of extracting them to remove most of the oil content thereof by soaking the particles in a full miscella, comprising about from 5 to 25%, by weight, of the vegetable oil being extracted dissolved in an oil extraction solvent therefor, for about from 3 to 30 minutes, freeing the resultant marc from substantially all entrained miscella by filtration and at least one washing with less than said full miscella, re-extracting the filtered and washed marc by soaking it in less than said full miscella for about from 10 to 60 minutes, and freeing the soaked marc from substantially all entrained miscella by filtration and a plurality of washings using miscellas increasingly less than said full miscella and finally oil-free sovent, said steps being carried out using an overall solvent to oil-bearing particles ratio ranging from about 0.7–1.1 to 1.0.

5. The process of claim 4 wherein the oil-bearing material contains less than about 45% by weight of extractable oil, the oil extraction solvent is hexane, and the overall solvent to oil-bearing particles ratio ranges from about 0.7–0.9 to 1.0.

6. The process of claim 4 wherein the oil-bearing material contains more than about 45% by weight of extractable oil, the oil extraction solvent is hexane, and the overall solvent to oil-bearing particles ratio ranges from about 0.8–1.1 to 1.0.

References Cited in the file of this patent

UNITED STATES PATENTS

| | | |
|---|---|---|
| 2,467,402 | Pascal | Apr. 19, 1949 |
| 2,467,404 | Pascal | Apr. 19, 1949 |
| 2,596,010 | Crawford | May 6, 1952 |
| 2,616,909 | Carter | Nov. 4, 1952 |
| 2,680,754 | Stapelberg | June 8, 1954 |
| 2,726,253 | Gastrock et al. | Dec. 6, 1955 |